United States Patent [19]

Finkelstein et al.

[11] Patent Number: 5,319,712
[45] Date of Patent: Jun. 7, 1994

[54] METHOD AND APPARATUS FOR PROVIDING CRYPTOGRAPHIC PROTECTION OF A DATA STREAM IN A COMMUNICATION SYSTEM

[75] Inventors: Louis D. Finkelstein, Wheeling; James J. Kosmach, Palatine; Jeffrey C. Smolinske, Hoffman Estates, all of Ill.

[73] Assignee: Motorola, Inc., Schaumburg, Ill.

[21] Appl. No.: 112,780

[22] Filed: Aug. 26, 1993

[51] Int. Cl.[5] .............................................. H04L 9/28
[52] U.S. Cl. .......................................... 380/44; 380/49
[58] Field of Search ............................ 380/25, 44, 49; 370/94.1

[56] References Cited

U.S. PATENT DOCUMENTS

| | | | |
|---|---|---|---|
| 4,866,772 | 9/1989 | Schroyer | 380/25 |
| 5,099,517 | 2/1992 | Gupta et al. | 380/49 |
| 5,161,193 | 11/1992 | Lampson et al. | 380/49 |
| 5,235,595 | 8/1993 | O'Dowd | 370/94.1 |
| 5,235,644 | 8/1993 | Gupta et al. | 380/49 |

OTHER PUBLICATIONS

"The Basics Book of OSI and Network Management" by Motorola Codex from Addison-Wesley Publishing Company, Inc., 1993 (First Printing Sep. 1992).

"Description of Receiver State Feedback Protocol" proposed by AT & T Bell Laboratories, 1000 East Warrenville Road, Naperville, Ill. 60566 which was presented to the Telecommunications Industry Association (TIA) subcommittee TR45.3.2.5 for Digital Cellular Systems in the Data Services Task Group on Jul. 7, 1993 at the Woodmark Hotel in Kirkland.

"Proposed RLP Header Formats" proposed by AT & T Bell Laboratories, 1000 East Warrenville Road, Naperville, Ill. 60566-7013 which was presented to the Telecommunications Industry Association (TIA) subcommittee TR45.3.2.5 for Digital Cellular Systems in the Data Services Task Group on Jul. 7, 1993 at the Woodmark Hotel in Kirkland.

*Primary Examiner*—Salvatore Cangialosi
*Attorney, Agent, or Firm*—Shawn B. Dempster

[57] ABSTRACT

A method and apparatus for providing cryptographic protection of a data stream are described in accordance with the Open Systems Interconnection (OSI) model for a communication system. This cryptographic protection is accomplished on the transmitting side by assigning a packet sequence number to a packet derived from a data stream received from a network layer. Subsequently, a transmit overflow sequence number is updated as a function of the packet sequence number. Then, prior to communicating the packet and the packet sequence number on a physical layer, the packet is encrypted as a function of the packet sequence number and the transmit overflow sequence number. On the receiving side, the packet sequence number is extracted from the physical layer. In addition, a receive overflow sequence number is updated as a function of the packet sequence number. Finally, the encrypted packet is decrypted as a function of the packet sequence number and the receive overflow sequence number. In addition, a transmitting and a receiving communication unit for use in a communication system which includes cryptographic protection of a data stream is described.

18 Claims, 1 Drawing Sheet

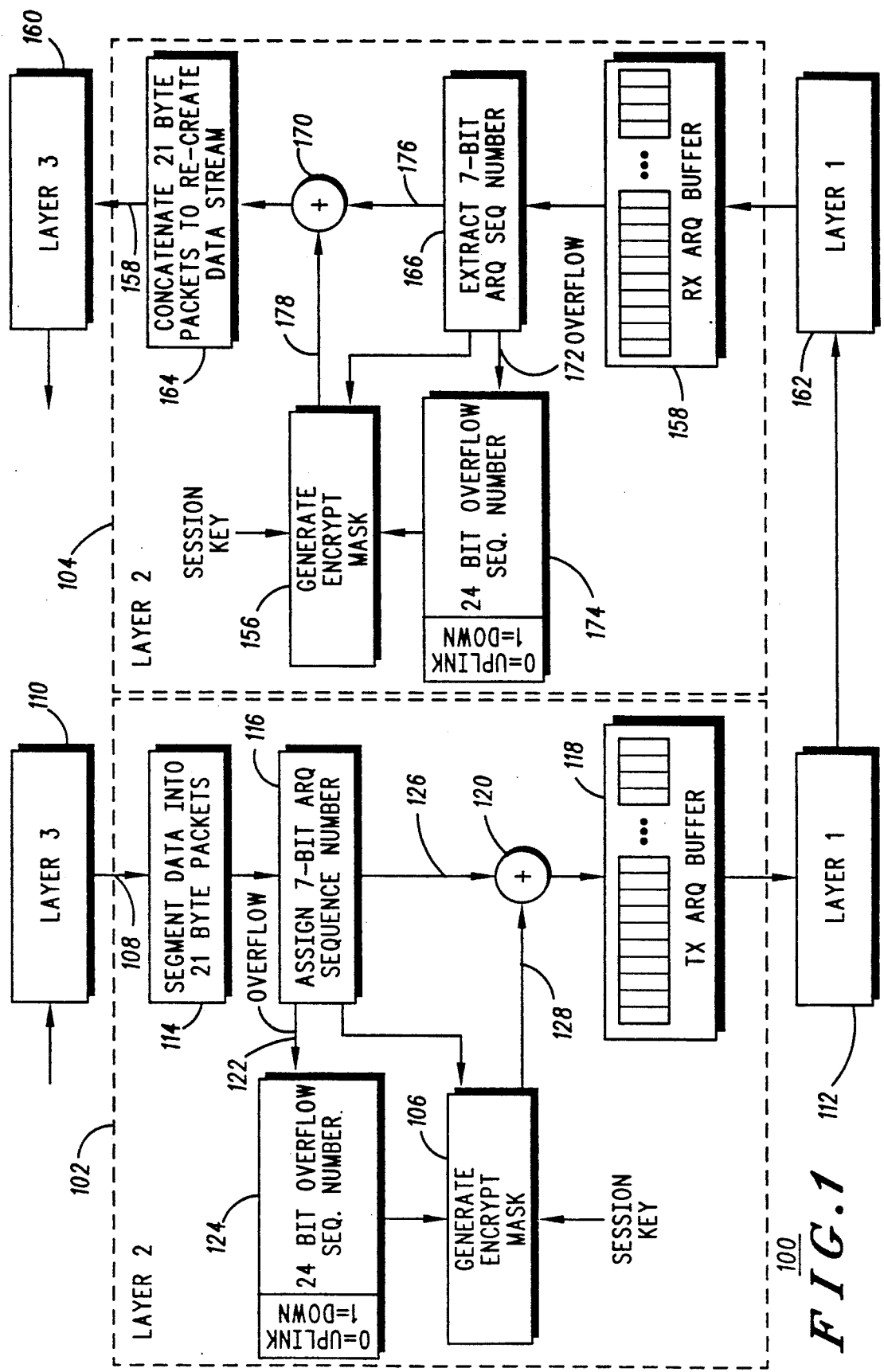

METHOD AND APPARATUS FOR PROVIDING CRYPTOGRAPHIC PROTECTION OF A DATA STREAM IN A COMMUNICATION SYSTEM

FIELD OF THE INVENTION

The present invention relates to communication systems and, more particularly, to cryptographic protection within communication systems.

BACKGROUND OF THE INVENTION

Many communications systems currently use encryption to enhance security of the systems. As will be appreciated by those skilled in the art, these communication systems can be described according to the Open Systems Interconnection (OSI) model which includes seven layers including an application, presentation, session, transport, network, link, and physical layer. The OSI model was developed by the International Organization for Standardization (ISO) and is described in "The Basics Book of OSI and Network Management" by Motorola Codex from Addison-Wesley Publishing Company, Inc., 1993 (First Printing September 1992).

Communication systems include, but are not restricted, to cellular radio telephone communication systems, personal communication systems, paging systems, as well as wireline and wireless data networks. By way of example a cellular communication system will be described below; however, it will be appreciated by those skilled in the art that the encryption techniques described can be readily extended to other communication systems without departing from the scope and spirit of the present invention.

Turning now to cellular communication systems, these systems typically include subscriber units (such as mobile or portable units) which communicate with a fixed network communication unit (i.e., a base site) via radio frequency (RF) communication links. In cellular communication systems, the RF communication link is the primary target for cryptographic systems, because it is the most vulnerable to unauthorized introduction (spoofing) or extraction (eavesdropping) of information. It is well known in the art that information in these communication links may be cryptographically protected by encrypting them with a pseudo-noise (PN) signal which is pseudo-random in nature. For example this may be accomplished by performing an exclusive-or operation of an information signal with a PN signal, prior to transmission. Subsequently, the inverse operation can be performed during the receiving process.

In addition, another encryption technique which is used in the authentication process is described in the United States Digital Cellular (USDC) standard (known as IS-54 and IS-55) and published by the Electronic Industries Association (EIA), 2001 Eye Street, N.W., Washington, D.C. 20006. The USDC encryption technique utilizes a series of specialized messages which must be passed between the subscriber unit and a base site communication unit of the communication system to generate shared secret data (SSD) encryption variables (i.e., encrypting keys known to a subscriber unit and a communication unit which form a communication link) for an authentication (i.e., the $SSD_A$ key) and a voice privacy function (i.e., the $SSD_B$ key).

While the USDC voice privacy encryption process, which utilizes a short, non-changing PN sequence that is repeatedly used to encrypt each successive voice packet, is sufficient for a typically non-redundant voice signal, it is not optimized for use with a highly redundant data stream typical of packetized data communication systems. Packetized data adds an additional problem to the typical encryption process. Packets of data may arrive at different times at a subscriber unit or a base site communication unit because of the unreliability of the physical communication link and because of the algorithms used to compensate for this unreliability. These "packetized" data packets merely need to be reassembled in the same order in which they were created. Therefore, a need exists for an encryption technique which can alleviate the foregoing problems associated with packetized data.

SUMMARY OF THE INVENTION

These needs and others are substantially met through the provision of a method and apparatus for providing cryptographic protection of a data stream in a communication system. The communication system is described in accordance with the Open Systems Interconnection (OSI) model which includes seven layers including an application, presentation, session, transport, network, link, and physical layer. This cryptographic protection is accomplished on the transmitting side by assigning a packet sequence number to a packet derived from a data stream received from a network layer. Subsequently, a transmit overflow sequence number is updated as a function of the packet sequence number. Then, prior to communicating the packet and the packet sequence number on a physical layer, the packet is encrypted as a function of the packet sequence number and the transmit overflow sequence number. On the receiving side, the packet sequence number is extracted from the physical layer. In addition, a receive overflow sequence number is updated as a function of the packet sequence number. Finally, the encrypted packet is decrypted as a function of the packet sequence number and the receive overflow sequence number. In addition, a transmitting and a receiving communication unit for use in a communication system which includes cryptographic protection of a data stream is described.

BRIEF DESCRIPTION OF THE DRAWINGS

FIG. 1 is a block diagram showing a preferred embodiment communication system having cryptographic protection of a data stream in accordance with the present invention.

DETAILED DESCRIPTION

Referring now to FIG. 1, a preferred embodiment communication system 100 having cryptographic protection of a data stream in accordance with the present invention is shown. The communication system will be described in the following passages according to the OSI model. In this respect, it will be appreciated by those skilled in the art that the transmitting portion 102 of the data link layer (i.e., Layer 2) may be located in either the subscriber communication unit or base site communication unit of a cellular communication system. Similarly, the receiving portion 104 of the data link layer also may be located in either the subscriber communication unit or base site communication unit. In addition, the direction of transmission between the transmitting portion 102 and the receiving portion 104 may be either uplink (i.e., subscriber unit to base site unit) or downlink (i.e., base site unit to subscriber unit).

The preferred embodiment communication system 100 cryptographic protection scheme has been optimized for use in conjunction with a "Description of Receiver State Feedback Protocol" proposed by AT&T Bell Laboratories, 1000 East Warrenville Road, Naperville, Ill. 60566-7013 which was presented to the Telecommunications Industry Association (TIA) subcommittee TR45.3.2.5 for Digital Cellular Systems in the Data Services Task Group on Jul. 7, 1993, at the Woodmark Hotel in Kirkland, Wash. However, it will be appreciated by those skilled in the art that any automatic repeat request (ARQ) scheme may be utilized in the preferred embodiment described herein by using the data packet sequence number (SN) plus an extension for the data packet frame counter without departing from the scope or spirit of the present invention. In addition, a synchronous cipher scheme, as is used in the preferred embodiment, can be utilized in conjunction with any packetized data system that applies a sequence number to each packet.

In FIG. 1, a data stream 108 which comes from Network Layer 3 110 and goes to Network Layer 3 160 (renamed data stream 158) is transferred from the Data Link Layer 2 transmitter portion 102 to the Data Link Layer 2 receiver portion 104 reliably using the above-noted Receiver State Feedback protocol on Physical Layer 1 112, 162. The data stream preferably consists of a digitized information signal containing system control information, short messages, graphic image information, compressed voice, textual data, and or any other form of data which can be digitized for transfer over a radio communication link. A pseudo-random bit generator 106, 156, respectively, is used to generate an encrypt mask and a decrypt mask for enciphering and deciphering the data stream 108, 158, respectively. In order to accomplish this search pseudo-random bit generator 106, 156 is re-initialized during each data frame by using a session key and a frame number. The session key preferably is a shared secret data (SSD) key which was derived from a previously completed authentication process by the communication units which are currently performing the data stream transfer. In addition, the frame number preferably is a 32 bit number which is maintained as a side effect of the ARQ scheme. The frame number preferably has the structure shown in Table 1 below.

TABLE 1

| Bit 31 | Bits 30 thru 7 | Bits 6 thru 0 |
|---|---|---|
| Direction<br>0 = uplink<br>1 = downlink | Overflow<br>Counter | SN<br>(ARQ sequence<br>number) |

The upper bit indicates the direction of data stream transfer and is used to prevent repeated use of the same encryption mask, once in each direction, the lower bits are identical to the ARQ sequence number SN and the middle bits are an overflow counter, incremented every time the sequence number SN rolls over.

As can be seen in FIG. 1, the encipherment 120 is performed (e.g., an exclusive-or operation of the packetized data stream 126 with the encryption mask 128) on the Layer 3 data stream 108 after it has been segmented 114 into 21 byte packets and a 7-bit long ARQ sequence number SN has been assigned 116, but before the data segment enters the ARQ repeat mechanism 118. When SN 116 rolls over (e.g., indicated by an overflow signal 122), the 24 bit long overflow counter 124 is incremented. Each Layer 2 packetized data stream segment so encrypted is then put into the ARQ transmission buffer 118 and is transmitted to the Layer 2 receiver portion 102 by the ARQ mechanism on Layer 1 112, 162. The Layer 2 header information (including the sequence number) is not encrypted. Because the encryption 120 is done above the ARQ repeat mechanism, each data segment 126 is encrypted only once no matter how many times the ARQ mechanism 112, 118, 162, 168 requires it to be retransmitted across the data link.

On the Data Link Layer 2 receiver portion 104, the ARQ mechanism accumulates Layer 2 frames in a receiver buffer 168. The receiver buffer 168 is used to hold Layer 2 frames that have been received out of sequence. Once all previous frames have been received reliably, the 7 bit long SN is extracted 166 and the overflow counter 174 is incremented if SN has rolled over (e.g., indicated by an overflow signal 172). SN and the overflow counter are used along with session key (i.e., an SSD) to generate 156 the identical pseudo-random bit stream 178 (i.e., decrypt mask) that was used to encrypt the Layer 2 packetized data stream segment. Subsequently, the packetized data stream segment 178 is sent to the decryption unit 170 where each of the segments 176 are decrypted in the correct sequence. After each segment is decrypted, the Layer 3 data stream 158 is then reconstructed 164 from the 21 byte length packets. It should be noted that by placing the decryption above the receiver portion 104 ARQ buffer 168, each data frame is decrypted only once regardless of the number of times it is transmitted across the physical layer 112, 162 communication link.

It will be appreciated by those skilled in the art that the preferred embodiment cryptographic protection scheme (i.e., a synchronous cipher scheme) which is described above is more robust than non-synchronized encryption scheme which could be implemented in the Network Layer 3. For example, in the case of the ARQ scheme failing to detect a corrupted data segment, it is probable that an incorrect number of data bytes would be sent to Layer 3. If the encryption were performed at Layer 3 all subsequent data packets would be decrypted incorrectly when a single packet is lost. However in a Layer 2 encryption, the synchronous cipher restarts the decryption unit 170 for each data segment and only the data segment containing the error is lost. All subsequent data frames are decrypted correctly.

In an alternative embodiment, if no ARQ mechanism is used, the data stream 108 can be handled by using a similar segment structure at Layer 2 with a sequence number SN. However, because there is no automatic repeat, each packetized data stream segment is encrypted and then transmitted just once. In addition, the Layer 2 receiving portion 104 expects to receive the segments (packets) in sequence. Because the sequence number is large, up to 63 consecutive data segments (packets) can be lost without creating an ambiguity in the state of the overflow counter 174 in the receiving portion 104. It should be noted that an exchange of acknowledge messages at call startup and following handoffs may be required in order to unambiguously initialize the overflow counters 124, 174.

Another concern is how to handle encryption through a communication channel handoff in a cellular system, the best way to handle this depends upon the precise operation of the radio link protocol (RLP) during handoff. However, typically the sequence number SN is reset when establishing a new data link. If that is the way RLP operates, then the overflow counter should be initialized to a value which is one greater than its value before the handoff. An acknowledged exchange of messages during the handoff also may be necessary in order to communicate the state of the overflow counters 124, 174.

The preferred embodiment of the present invention may be summarized in reference to FIG. 1 in the following manner. In a communication system 100 having a physical layer (Layer 1), data link layer (Layer 2), and a network layer (Layer 3), a method and apparati for providing cryptographic protection of a data stream are shown. The cryptographic protection is provided by segmenting 114 a data stream 108 received from the network layer 110 into a plurality of packets. A packet sequence number is assigned 116 to each packet of the plurality of packets. In addition, each transmit overflow sequence number is updated 124 as a function of each packet sequence number. Further, each transmit overflow sequence number is modified 124 to indicate the direction of transmission. This direction of transmission may be an uplink transmission or a downlink transmission. Each particular packet of the plurality of packets is encrypted 120 as a function of a predetermined session key, the packet sequence number associated with the particular packet, and the modified transmit overflow sequence number associated with the particular packet. The encrypted plurality of packets are buffered 118 for subsequent transmission. The encrypted plurality of packets and the packet sequence number associated with each packet are transmitted on the physical layer 112 and 162.

In the receiving portion 104, the encrypted plurality of packets and the packet sequence number associated with each packet are received from the physical layer into a receiving buffer 168. Each packet sequence number is extracted 166 from the receiving buffer. In addition, the plurality of packets are organized within the receiving buffer 168 to ensure that the plurality of packets are extracted from the receiving buffer in order by sequence number. Further, a receive overflow sequence number is updated 174 as a function of each packet sequence number. The receive overflow sequence numbers are modified to indicate the direction of reception, where the direction of reception is either an uplink reception or a downlink reception. Subsequently, each encrypted packet of the plurality of packets in the receiving buffer is decrypted 170 as a function of the predetermined session key, the packet sequence number associated with the particular packet, and the modified receive overflow sequence number associated with the particular packet. Finally, the decrypted plurality of packets is concatenated 164 to form a received data stream 158 which is sent to the network layer 160.

Although the invention has been described and illustrated with a certain degree of particularity, it is understood that the present disclosure of embodiments has been made by way of example only and that numerous changes in the arrangement and combination of parts, as well as steps, may be resorted to by those skilled in the art without departing from the spirit and scope of the invention as claimed. For example, the communication channel could alternatively be an electronic data bus, computer network line, wireline, optical fiber link, satellite link, or any other type of communication channel.

What is claimed is:

1. In a communication system having a physical layer, data link layer, and a network layer, a method for providing cryptographic protection of a data stream, comprising:
   (a) assigning a packet sequence number to a packet derived from a data stream received from the network layer;
   (b) updating a transmit overflow sequence number as a function of the packet sequence number;
   (c) encrypting, prior to communicating the packet and the packet sequence number on the physical layer, the packet as a function of the packet sequence number and the transmit overflow sequence number;
   (d) extracting the packet sequence number from the physical layer;
   (e) updating a receive overflow sequence number as a function of the packet sequence number; and
   (f) decrypting the encrypted packet as a function of the packet sequence number and the receive overflow sequence number.

2. The method of claim 1 wherein:
   (a) the step of updating the transmit overflow sequence number includes modifying each transmit overflow sequence number to indicate the direction of transmission, the direction of transmission being selected from the group consisting of a uplink transmission and a downlink transmission; and
   (b) the step of updating the receive overflow sequence number includes modifying each receive overflow sequence number to indicate the direction of reception.

3. The method of claim 1:
   (a) further comprising the step of buffering the encrypted packet;
   (b) further comprising the step of transmitting the encrypted packet and the packet sequence number associated with the packet on the physical layer;
   (c) further comprising the step of receiving the encrypted packet and the packet sequence number associated with the packet from the physical layer into a receiving buffer; and
   (d) wherein the step of extracting comprises extracting the packet sequence number from the receiving buffer.

4. The method of claim 1 further comprising the steps of:
   (a) concatenating the decrypted packet with other decrypted packets to form a received data stream; and
   (b) sending the received data stream to the network layer.

5. In a communication system having a physical layer, data link layer, and a network layer, a method for providing cryptographic protection of a data stream, comprising:
   (a) segmenting a data stream received from the network layer into a plurality of packets;
   (b) assigning a packet sequence number to each packet of the plurality of packets;
   (c) updating each transmit overflow sequence number as a function of each packet sequence number;
   (d) modifying each transmit overflow sequence number to indicate the direction of transmission, the direction of transmission being selected from the group consisting of an uplink transmission and a downlink transmission;
   (e) encrypting each particular packet of the plurality of packets as a function of a predetermined session key, the packet sequence number associated with the particular packet, and the modified transmit overflow sequence number associated with the particular packet;

(f) buffering the encrypted plurality of packets;

(g) transmitting the encrypted plurality of packets and the packet sequence number associated with each packet on the physical layer;

(h) receiving the encrypted plurality of packets and the packet sequence number associated with each packet from the physical layer into a receiving buffer;

(i) extracting each packet sequence number from the receiving buffer;

(j) organizing the plurality of packets within the receiving buffer to ensure that the plurality of packets are extracted from the receiving buffer in order by sequence number;

(k) updating a receive overflow sequence number as a function of each packet sequence number;

(l) modifying each receive overflow sequence number to indicate the direction of reception, the direction of reception being selected from the group consisting of an uplink reception and a downlink reception;

(m) decrypting each encrypted packet of the plurality of packets in the receiving buffer as a function of the predetermined session key, the packet sequence number associated with the particular packet, and the modified receive overflow sequence number associated with the particular packet;

(n) concatenating the decrypted plurality of packets to form a received data stream; and (o) sending the received data stream to the network layer.

6. A transmitting communication unit for providing cryptographic protection of a data stream in a communication system having a physical layer, data link layer, and a network layer, transmitting communication unit comprising a data link layer device having:

(a) assigning means for assigning a packet sequence number to a packet derived from a data stream received from the network layer;

(b) updating means, operatively coupled to the assigning means, for updating a transmit overflow sequence number as a function of the packet sequence number; and (c) encrypting means, operatively coupled to the assigning means and the updating means, for encrypting, prior to communicating the packet and the packet sequence number on the physical layer, the packet as a function of the packet sequence number and the transmit overflow sequence number.

7. The transmitting communication unit of claim 6 wherein the data link layer device updating means comprises means for modifying each transmit overflow sequence number to indicate the direction of transmission, the direction of transmission being selected from the group consisting of a uplink transmission and a downlink transmission.

8. The transmitting communication unit of claim 6 wherein the data link layer device further comprises a buffer means, operatively coupled to the encrypting means, for buffering the encrypted packet and the transmitting communication unit further comprises a physical layer device, operatively coupled to the data link layer device, having transmitting means for transmitting the encrypted packet and the packet sequence number associated with the packet on the physical layer.

9. The transmitting communication unit of claim 6 wherein the physical layer includes a communication channel selected from the group consisting of an electronic data bus, computer network line, wireline, optical fiber link, satellite link, and a radio communication link.

10. The transmitting communication unit of claim 6 wherein the communication unit is selected from the group consisting of the subscriber communication unit and the base site communication unit of the communication system.

11. A receiving communication unit for providing cryptographic protection of a data stream in a communication system having a physical layer, data link layer, and a network layer, receiving communication unit comprising a data link layer device having:

(a) extracting means for extracting a packet sequence number from the physical layer;

(b) updating means, operatively coupled to the extracting means, for updating a receive overflow sequence number as a function of the packet sequence number; and (c) decrypting means, operatively coupled to the extracting means and the updating means, for decrypting an encrypted packet as a function of the packet sequence number and the receive overflow sequence number.

12. The receiving communication unit of claim 11 wherein the data link layer device updating means comprises means for modifying each receive overflow sequence number to indicate the direction of reception, the direction of reception being selected from the group consisting of a uplink reception and a downlink reception.

13. The receiving communication unit of claim 11 further comprising a physical layer device, operatively coupled to the data link layer device, having a receiving means for receiving the encrypted packet and the packet sequence number associated with the packet into a receiving buffer and wherein the data link layer extracting means comprises means for extracting the packet sequence number from the receiving buffer.

14. The receiving communication unit of claim 11 wherein the physical layer includes a communication channel selected from the group consisting of an electronic data bus, computer network line, wireline, optical fiber link, satellite link, and a radio communication link.

15. The receiving communication unit of claim 11 wherein the communication unit is selected from the group consisting of the subscriber communication unit and the base site communication unit of the communication system.

16. The receiving communication unit of claim 11 wherein the data link layer device further comprises:

(a) concatenating means, operatively coupled to the decrypting means, for concatenating the decrypted packet with other decrypted packets to form a received data stream; and (b) sending means, operatively coupled to the concatenating means, for sending the received data stream to the network layer.

17. In a communication system having a physical layer, data link layer, and a network layer, a method for providing cryptographic protection of a data stream, comprising:

(a) assigning a packet sequence number to a packet derived from a data stream received from the network layer;
(b) updating a transmit overflow sequence number as a function of the packet sequence number; and
(c) encrypting, prior to communicating the packet and the packet sequence number on the physical layer, the packet as a function of the packet sequence number and the transmit overflow sequence number.

18. In a communication system having a physical layer, data link layer, and a network layer, a method for providing cryptographic protection of a data stream, comprising:
(a) extracting a packet sequence number from the physical layer;
(b) updating a receive overflow sequence number as a function of the packet sequence number; and
(c) decrypting an encrypted packet as a function of the packet sequence number and the receive overflow sequence number.

* * * * *